(12) United States Patent
Kim et al.

(10) Patent No.: US 9,911,170 B2
(45) Date of Patent: Mar. 6, 2018

(54) ARRANGING A TRANSPORT SERVICE FOR A USER BASED ON THE ESTIMATED TIME OF ARRIVAL OF THE USER

(71) Applicant: Uber Technologies, Inc., San Francisco, CA (US)

(72) Inventors: Nuri Kim, San Francisco, CA (US); Christopher Haugli, San Francisco, CA (US); Rachel Lin, San Francisco, CA (US); Hasrat Godil, San Francisco, CA (US); Jeffrey Wolski, San Francisco, CA (US); Amos Barreto, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 14/832,782

(22) Filed: Aug. 21, 2015

(65) Prior Publication Data
US 2016/0055605 A1 Feb. 25, 2016

Related U.S. Application Data

(60) Provisional application No. 62/040,347, filed on Aug. 21, 2014.

(51) Int. Cl.
*G01S 1/00* (2006.01)
*G06Q 50/30* (2012.01)

(52) U.S. Cl.
CPC .................................. *G06Q 50/30* (2013.01)

(58) Field of Classification Search
USPC ....................................................... 701/465
See application file for complete search history.

(56) References Cited

U.S. PATENT DOCUMENTS

| 6,608,566 B1 * | 8/2003 | Davis ....................... G01H 1/00 340/870.11 |
| 6,832,092 B1 * | 12/2004 | Suarez .................. H04W 84/08 455/456.1 |
| 7,522,995 B2 | 4/2009 | Nortrup |
| 8,412,667 B2 * | 4/2013 | Zhang .................. G01S 5/0027 706/54 |
| 8,762,048 B2 | 6/2014 | Kosseifi |

(Continued)

FOREIGN PATENT DOCUMENTS

| JP | 2013-175144 | 9/2013 |
| KR | 10-2012-0079549 | 6/2012 |

OTHER PUBLICATIONS

ISR/Written Opinion in corresponding International Application No. PCT/US2015/046388, dated Nov. 17, 2015.

*Primary Examiner* — Jean-Paul Cass
(74) *Attorney, Agent, or Firm* — Mahamedi IP Law LLP

(57) ABSTRACT

A system and method of arranging a transport service for a user is described. The system determines a first estimated time of arrival (ETA) of a user to a specified location data point based, at least in part, on a position of a user device operated by the user. The system also determines a second ETA of a vehicle of a set of vehicles to the specified location data point. When the first ETA and the second ETA are within a predetermined amount of time of each other, the system can select a driver to provide a transport service for the user based, at least in part, on the specified location data point.

15 Claims, 8 Drawing Sheets

(56) References Cited

U.S. PATENT DOCUMENTS

| | | | |
|---|---|---|---|
| 2003/0058082 A1* | 3/2003 | Mallick | G07C 9/00007 340/5.6 |
| 2006/0023569 A1* | 2/2006 | Agullo | G01V 1/301 367/73 |
| 2006/0155460 A1* | 7/2006 | Raney | G01C 21/20 701/468 |
| 2008/0033633 A1* | 2/2008 | Akiyoshi | G01C 21/343 701/418 |
| 2009/0156241 A1* | 6/2009 | Staffaroni | G06Q 10/06311 455/466 |
| 2009/0248587 A1* | 10/2009 | Van Buskirk | G06Q 10/06 705/80 |
| 2010/0074383 A1* | 3/2010 | Lee | H04J 3/0667 375/354 |
| 2011/0238755 A1* | 9/2011 | Khan | G06Q 50/01 709/204 |
| 2012/0203599 A1 | 8/2012 | Choi | |
| 2012/0232943 A1 | 9/2012 | Myr | |
| 2013/0215843 A1* | 8/2013 | Diachina | H04W 74/00 370/329 |
| 2014/0074536 A1* | 3/2014 | Meushar | G06Q 10/109 705/7.19 |
| 2014/0129302 A1 | 5/2014 | Amin et al. | |
| 2014/0149441 A1* | 5/2014 | Wang | G06F 17/30964 707/758 |
| 2014/0378159 A1* | 12/2014 | Dolbakian | H04W 64/006 455/456.1 |
| 2015/0161698 A1* | 6/2015 | Jones | G06Q 30/0611 705/26.4 |
| 2015/0262430 A1* | 9/2015 | Farrelly | H04L 67/306 705/13 |
| 2016/0026936 A1* | 1/2016 | Richardson | G06Q 10/02 705/5 |
| 2017/0083832 A1* | 3/2017 | Williams | G06Q 10/02 |

* cited by examiner

ARRANGING A TRANSPORT SERVICE FOR A USER BASED ON THE ESTIMATED TIME OF ARRIVAL OF THE USER

RELATED APPLICATIONS

This application claims the benefit of priority to U.S. Provisional Patent Application No. 62/040,347, filed Aug. 21, 2014, titled ARRANGING A TRANSPORT SERVICE FOR A USER BASED ON THE ESTIMATED TIME OF ARRIVAL OF THE USER; the aforementioned application being incorporated by reference in its entirety.

BACKGROUND

A transport service arrangement system can provide a platform to enable users to request transport services through use of computing devices. For example, a transport service arrangement system can process requests for transport services by determining services providers to perform the transport services for the requesting users based on a plurality of different factors or conditions. However, because a transport service arrangement system can operate on a real-time or on-demand basis, in many cases, a user must plan in advance before actually making a request for a transport service.

DETAILED DESCRIPTION

Figure 1A:
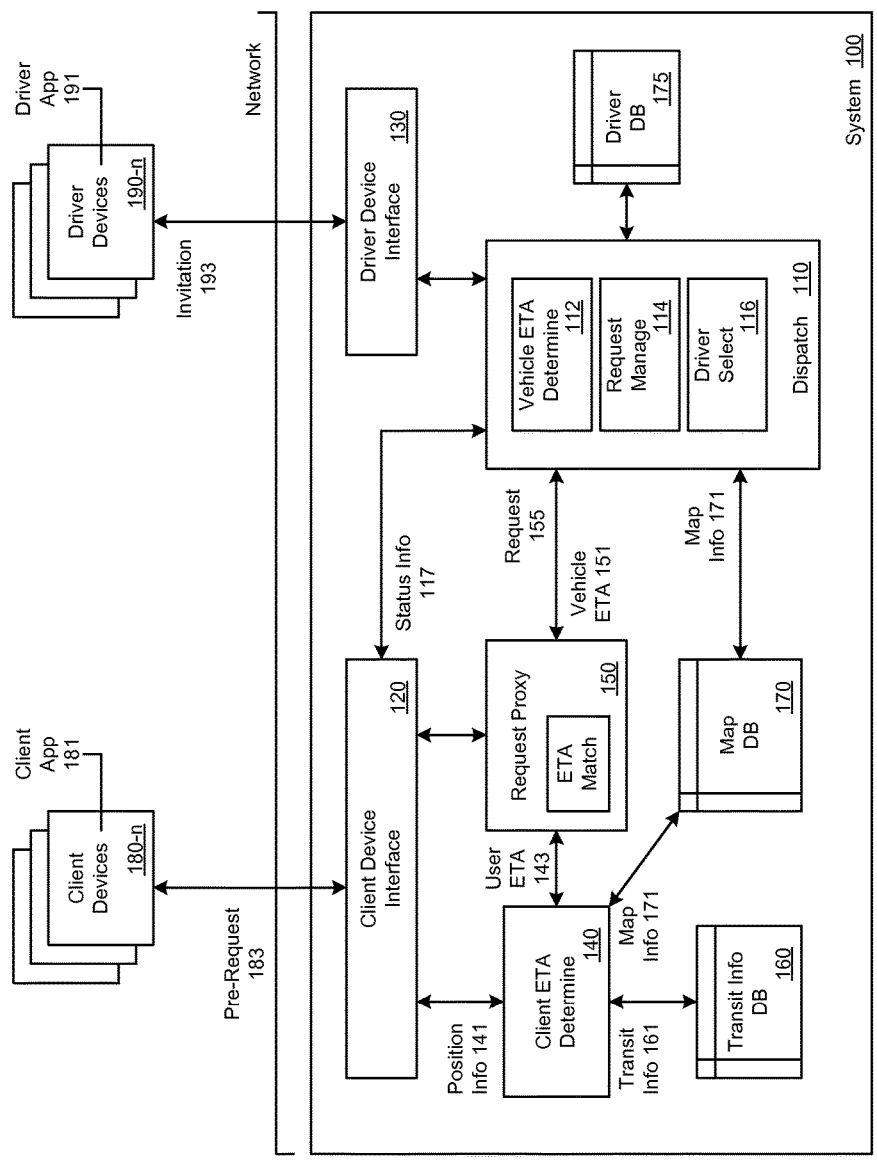
FIGS. 1A and 1B illustrate example systems to arrange a transport service for a user, under an embodiment.

Examples described herein provide for a transport service arrangement system to trigger or make a transport request on behalf of a user based on the user's estimated time of arrival (ETA) to a specified location. The system can also determine the ETA of a set of drivers or vehicles to the specified location. In this manner, based on the ETAs, the system can trigger or make a transport request for the user at a certain time (e.g., on behalf of the user), so that a vehicle can be estimated to arrive at the specified location at substantially the same time as the user. This can minimize the amount of time a user has to wait for a vehicle when the user makes a transport request once he or she arrives at a specified location.

According to some examples, the transport service arrangement system can periodically determine or check (i) a first ETA of the user to a specified location data point and (ii) a second ETA of at least a vehicle of a set of vehicles to the specified location data point. The system can periodically compare the first ETA and the second ETA to determine if the first ETA and the second ETA are substantially equal or are within a predetermined amount of time of each other. As described herein, "substantially" means at least nearly a stated amount or quantity, or at least 90% of a stated quantity or expression. When the system determines that the first and the second ETAs are substantially equal or are within a predetermined amount of time of each other, the system can trigger or make a transport request for the user. In one example, the system can select a driver to provide a transport service for the user based, at least in part, on the specified location data point.

Depending on implementation, the first ETA can be determined based on the user's position information (e.g., position information provided by the user's device), map information, and/or transit information associated with the method of transit specified by the user. For example, the user's device can periodically provide its current location data point to the system, and the system can dynamically determine the user's rate of travel based on the location data points. The system can also use transit information, such as routes that a transit vehicle (e.g., a plane, a train, a bus, a light-rail train, a bike, a car, etc.) can travel and/or predefined stops or stations, along with the user's rate of travel to determine the first ETA. Similarly, the second ETA can be determined based on location information of vehicles that are within a predefined distance of the specified location data point and/or map information. As referred herein, a location data point can correspond to a latitude and a longitude coordinate, or another location coordinate using a different mapping system.

Still further, in one example, the system can periodically determine and/or compare the first ETA and the second ETA at the same rate, at different rates, and/or at different instances of time. According to some examples, the system can also dynamically adjust the rate in which the system periodically determines the first ETA and the second ETA. For example, as the difference between the first ETA and the second ETA becomes smaller (e.g., approaches zero or another predetermined value), the system can determine and compare the first and second ETAs more frequently.

Among other benefits and technical effect, some examples described herein provide a mechanism to intelligently determine the appropriate time to make a request for a service on behalf of a user based on data received from the user's computing device. As compared to conventional approaches, by requesting the service for users at a certain times, the system can eliminate the guesswork or speculation by users in attempting to make a request at the right time, and can reduce the overall amount of wait times for users. Still further, the system can obtain data from both user devices and driver devices without user and driver involvement, respectively, and can perform operations without user involvement for a potentially a long period of time, thereby minimizing the inconvenience for the user. In other words, the user does not have to frequently check where he or she is, and similarly, does not have to frequently check the status of the drivers.

According to examples, a transport arrangement system is provided to arrange transport as between drivers and riders (or alternatively "users" "passengers" and variants thereof) in a manner that balances and optimizes the interest of drivers and riders. This is in contrast to conventional approaches, where, for example, transport providers may bunch at one location, or act in a manner that is centric to themselves, as such providers generally lack awareness (e.g., positional awareness) of other drivers. To the extent conventional transport providers utilize dispatches, such dispatchers are generally not able to anticipate transport requests, and information about individual providers may be limited (e.g., geographically course, based on drivers self-reporting location).

Moreover, the transport arrangement services can be provided in an anticipatory manner, specifically to provide a trigger that can time a transport request from a rider before the rider arrives at a pickup location. With implementation of such a trigger, a request for transport can be triggered from the rider (or on behalf of the rider) so that the rider has a minimal wait time when arriving at a pickup location. A remote service further provides an ability to monitor the rider (with rider approval or permission), in order to predict the rider's arrival at the destination without disclosing the location information of the driver. The prediction of the rider's arrival to the pickup location can be made objectively, without influence from the rider, and without sacrificing the rider's privacy. In this regard, the remote transport arrangement service can obtain information that has not been previously been available for use in arranging transport services-specifically, location information and pickup times for riders who intend to receive transport services at a pickup location, but who have yet to make such request (or have transport arranged for them).

In addition to predicting the rider's arrival to the pickup location, a remote transport arrangement service can monitor and determine information affecting the amount of time needed for a provider to drive to the pickup location. Under conventional approaches, such information is unavailable to the riders, as no rider could interface with multiple drivers absent use of technology such as described with examples provided herein.

In contrast to conventional approaches, examples as described monitor for the real-time locations of transport providers and their current status, as well as traffic and roadway congestions affecting the ability of transport providers to drive to a pickup location. As the transport arrangement service can monitor riders who are approaching a pickup location, the transport arrangement service can also anticipate demand for transport providers when a given rider arrives at a pickup location. Such information may not be available to the riders or drivers absent a remotely operated transport arrangement service as described by various examples.

Moreover, examples recognize that, absent a remote service to arrange transport, transport providers, whether operating as individuals or through dispatchers, lack sufficient information and authority over one another to enable optimization of how transport requests are answered. By way of example, drivers lack information corresponding to, for example, the real-time location of other drivers or riders, as well as information indicating status of drivers (e.g., driver has no passengers, has a passenger and is on a trip, or is completing a trip). In contrast, examples include a remotely implemented transport service which that implements an objective selection process that balances the interests of drivers (to field transport requests) and riders to receive transport services with minimal wait times. As described, a remotely implemented transport service can be provided that communicates with mobile computing devices of riders and drivers, in order to determine information for optimizing the rider/service experience of riders and drivers. The remotely implemented transport service can utilize secure communication channels to identify position information of riders before the riders request the transport service, for purpose of predicting the optimal moment when a driver is to be requested (or dispatched) for the rider.

In this regard, examples as described further technology utilized for arranging on-demand services, by aggregating information from multiple sources in a manner that could not previously be done by any one party or individual, for purpose of providing predictive arrival time of riders to pickup location. By enabling such predictive determinations, examples can further optimize the manner in which transport requests are handled, to accommodate interests of both riders and drivers collectively.

As used herein, a client device, a driver device, a computing device, and/or a mobile device refer to devices corresponding to desktop computers, cellular devices or smartphones, personal digital assistants (PDAs), laptop computers, tablet devices, etc., that can provide network connectivity and processing resources for communicating with the system over one or more networks. Client devices and driver devices can each operate a designated service application (e.g., a client application and a driver application, respectively) that is configured to communicate with the transport service arrangement system. A driver device can also correspond to a computing device that is installed in or incorporated with a vehicle, such as part of the vehicle's on-board computing system.

Still further, examples described herein relate to a variety of on-demand services, such as a transport service, a food truck service, a delivery service, an entertainment service, etc. to be arranged between users and service providers. In other examples, the system can be implemented by any entity that provides goods or services for purchase through the use of computing devices and network(s).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1B:
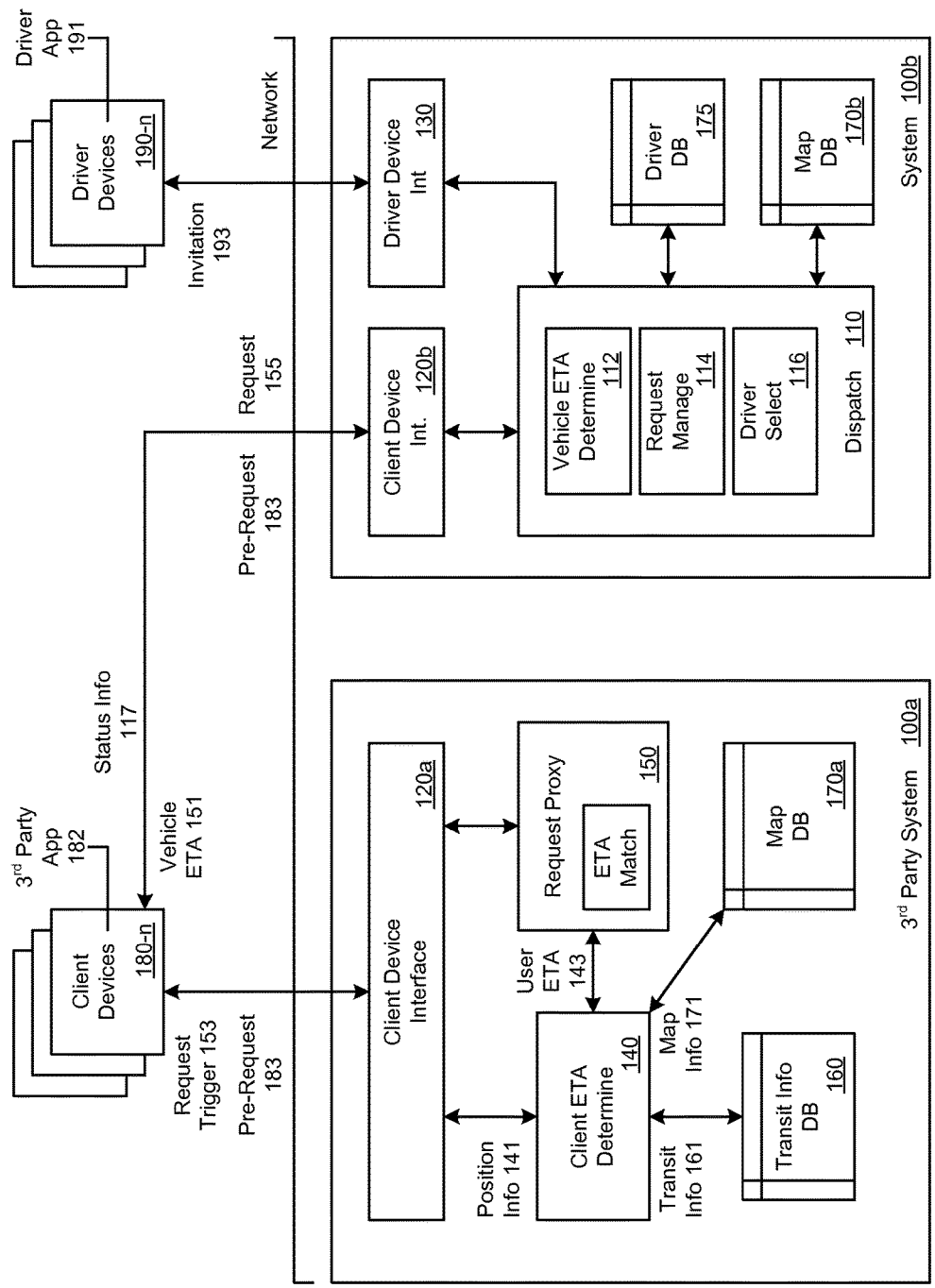

FIGS. 1A and 1B illustrate example systems to arrange a transport service for a user, under an embodiment. In the example of FIG. 1A, a transport service arrangement system 100 includes a dispatch 110, a client device interface 120, a driver device interface 130, a client ETA determine, a request proxy 150, and a plurality of databases, such as a transit information database 160, a map database 170, and a driver database 175. A plurality of client devices 180 and a plurality of driver devices 190 (e.g., service provider devices) can communicate with the system 100 over one or more networks using, for example, respective designated service applications 181, 191 that are configured to communicate with the system 100. The components of the system 100 can combine to determine ETAs for users and drivers, and to arrange on-demand services for users. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices 180 and/or the driver devices 190. For example, a client service application 181 and/or a driver service application 191 can execute to perform one or more of the processes described by the various components of the system 100. The system 100 can communicate over a network, via a network interface (e.g., wirelessly or using a wireline), to communicate with the one or more client devices 180 and the one or more driver devices 190.

The system 100 can communicate, over one or more networks, with client devices 180 and driver devices 190 using a client device interface 120 and a device interface 130, respectively. The device interfaces 120, 130 can each manage communications between the system 100 and the respective computing devices 180, 190. The client devices 180 and the driver devices 190 can individually operate client service applications 181 and driver service applications 191, respectively, that can interface with the device interfaces 120, 130 to communicate with the system 100. According to some examples, these applications can include or use an application programming interface (API), such as an externally facing API, to communicate data with the device interfaces 120, 130. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

The system 100 can enable users of client devices 180 to request on-demand transport services through use of the client applications 181. According to some examples, typically, a user can make a transport request using the client application 181 on the client device 180 and the client application 181 can transmit the transport request to the system 100. The dispatch 110 can receive the transport request, process the request, select a driver for the user, and send an invitation to the selected driver's device 190. If the selected driver accepts the invitation, the system 100 can provide the information about the selected driver to the client device 180 and inform the user the ETA of the selected driver via the client application 181. In such examples, the user may typically make the transport request at a time when the user is ready to be picked up for transport, as the system 100 begins to process the transport request immediately after receiving the transport request.

According to some examples, the client application 181 can present a user interface to enable a user to select or specify a method of transit, a start location data point, a specified or transfer location data point (e.g., a first destination location point), a final destination location data point (e.g., a second destination location point), a start time, and/or an end time. The client application 181 can provide a selection user interface, for example, in which the user can select one of multiple vehicle types or on-demand services (e.g., a first vehicle type such as a sedan, a different second vehicle type such as an SUV, etc.). The selection user interface, in one instance, can also include a pre-request vehicle type. When the user selects the pre-request vehicle type, the user can provide input to specify the various parameters for making a pre-request (e.g., a request for a later time).

As described herein, a method of transit can correspond to any method of traveling from one point to another, including by bicycle, motorcycle, car, bus, ferry, train, light-rail train, walking, etc. In many cases, a method of transit can also have corresponding transit information. As an example, a user may commute from San Jose, Calif. to San Francisco, Calif. by train, which takes the user from a first train station to a second train station (e.g., from the start location data point at a San Jose train station to a transfer location data point at a San Francisco train station). Once the user gets to the San Francisco train station, the user may want to receive transport service from the San Francisco train station to his or her office two miles away. Accordingly, a user can provide input via the user interface to specify which method of transit the user is taking, where she is, and which location (e.g., station or stop) she is traveling to, for example, and then submit a pre-request 183 that includes such specified information.

As described herein, a pre-request 183 is a request indicating that a transport service is needed at a time in the future (as compared to a time when the pre-request 183 is made) to transport the user from a specified location to another location. A pre-request 183, when received by the system 100, does not cause the dispatch 110 to immediately select a driver for the user (as compared to a typical transport request, as described above), but instead can cause the system 100 trigger or make a transport request for the user at a later time based on the user's ETA to the specified location. When the client application 181 transmits a pre-request 183, the system 100 can be triggered to perform operations in order to determine when to make a transport request on behalf of the user.

In some examples, the pre-request 183 can include information about a method of transit and/or a specified location data point corresponding to a location that the user is traveling to (and subsequently needs a transport service from). The pre-request 183 can also include other information, in some examples, such as the user's identifier, a payment method, a vehicle type. The request proxy 150 can receive the pre-request 183, and in response, can communicate with the client ETA determine 140 and the dispatch 110 to receive ETA information about the user and the ETA information about vehicles, respectively. Depending on implementation, the request proxy 150 can provide the specified location data point to the client ETA determine 140 and cause the client ETA determine 140 to periodically determine the ETA of the user to the specified location data point (referred to herein as the user ETA 143). In another example, the client ETA determine 140 can receive the pre-request 183 via the client device interface 120 and in response, periodically determine the user ETA 143.

When the pre-request 183 is made, the client application 181 can periodically transmit position information 141 of the user to the system 100. The position information 141 can correspond to a current location data point of the user's client device 180 at an instance in time. Such a location data point can be generated by a location detection component of the client device 180 (e.g., a global positioning system (GPS) receiver). In some examples, the client application 181 can transmit the position information 141 even when the client application 181 is closed from being displayed on the client device 180 (e.g., is running in the background), but not shut down entirely. The client ETA determine 140 can periodically receive the user's position information 141 (e.g., every two seconds, every five seconds, etc.) and periodically determine the user ETA 143 based on the user's position information 141 (e.g., every ten minutes, every five minutes, etc.). For example, at an instance in time when determining the user ETA 143, the client ETA determine 140 can compute the user's rate of travel based on the position of the client device 180 at one instance in time and the position of the client device 180 at a previous instance in time. Similarly, three or more positions can be used to determine both speed and/or acceleration of the user (and bearing or direction of travel). The client ETA determine 140 can determine the user ETA 143 based on the user's rate of travel. Accordingly, the user ETA 143 can dynamically change at different instances of time, as the user changes positions and speeds while traveling to the specified location data point.

Depending on implementation, the client ETA determine 140 can also periodically determine the user ETA 143 based on transit information 161 and/or map information 171. The transit information database 160 can include information about one or more methods of transit. For example, for a city bus system, the transit information database 160 can store information about the buses in that system, the bus routes, the times the buses operate on which routes, and/or the bus stop locations. Similarly, in another example, for a train system, the transit information database 160 can stored information about the different trains, the location and paths of the train tracks, the train times, and the train station locations. Although the transit information database 160 is illustrated as a single database, in other example, the system 100 can include or be capable of accessing multiple transit information databases.

The pre-request 183 can include information about the method of transit that the user specifies that he or she will be traveling on to the specified location. Based on the specified method of transit, the client ETA determine 140 can access the corresponding transit information 161 to determine the user ETA 143. In some examples, the user may also input which specific train, bus, ferry, etc., that the user is on or will take. As an example, if the user specified that she is traveling by train to the San Francisco train station, the client ETA determine 140 can determine the schedule of the trains that arrive at that train station, determine when the trains are to arrive at that train station, determine the current location of the user when the pre-request 183 was made, determine the route the trains takes, determine the user's rate of travel, and/or determine the user's direction of travel in order to determine the user ETA 143 to the San Francisco train station. By using transit information 161, in some instances, the client ETA determine 140 may determine the user ETA 143 with better accuracy (e.g., as opposed to just using the user's position information 141).

The client ETA determine 140 can also use map information 171 to determine the user ETA 143. The map database 170 can store map information 171 corresponding to different geographic regions, including information about highways, roads, intersections, points of interest, geographical features, etc. (e.g., as latitude and longitude coordinates). For example, the user may specify that the user's method of transit is walking or biking. Because a user does not typically travel in a straight line from the current location at the time the pre-request 183 was made, for example, to the specified location, the client ETA determine 140 can use map information 171 to determine the approximate distance the user would have to travel by traveling on roads or streets. In another example, map information 171 can also be used in conjunction with transit information 161 to if the user was traveling in another method of transit, such as a vehicle or a bus.

Using the position information 141, transit information 161, and/or map information 171, the client ETA determine 140 can periodically determine the user ETA 143 and provide the user ETA 143 to the request proxy 150. According to other examples, the client ETA determine 140 can access other databases or sources, such as third-party sources, to determine information about traffic, weather conditions, accidents, road closures, etc., in order to periodically determine the user ETA 143. Still further, in some examples, the system 100 can use transit information 161 and/or map information 171 to determine the user's specified location data point by translating or correlating the user-inputted specified transit stop or station (e.g., San Francisco train station) with a location data point (e.g., a coordinate).

In addition to periodically determining the user ETA 143, the system 100 can also periodically determine the ETA of a vehicle (or the ETA corresponding to a set of vehicles) to the specified location data point (referred to herein as the vehicle ETA 143). For example, the vehicle ETA determine 112 of the dispatch 110 can receive (from the client device interface 120 and/or from the request proxy 150) the specified location data point from the pre-request 183. The vehicle ETA determine 112 can identify a set of drivers (or vehicles) that are available to provide transport within a predetermined distance (referred to herein as a dispatch radius) from the specified location data point (or in a predetermined region that includes the specified location data point). In one example, the vehicle ETA determine 112 can identify only the set of drivers that drive vehicles corresponding to a specified vehicle type (as indicated in the pre-request 183).

The vehicle ETA determine 112 can identify the set of drivers by accessing the driver database 175. For example, the driver database 175 can be continuously and periodically updated with the drivers' current locations and availability statuses (e.g., by a driver tracking component that communicates with the driver device interfaces 130, not shown in FIG. 1A). Each time the vehicle ETA determine 112 determines the vehicle ETA 143, the vehicle ETA determine 112 can access the driver database 175 (and/or use map information 171) to identify a set of drivers in the predetermined distance from the specified location data point (e.g., because drivers are constantly changing position and some drivers may become available in the region or unavailable, may enter the region or leave the region, etc.). The vehicle ETA determine 112 can then determine individual vehicle ETAs for each of the set of drivers based on the current location of the individual drivers and the specified location data point. According to some examples, the vehicle determine 112 can determine the individual vehicle ETAs using the position information of drivers, map information 171, and/or other information from other databases or sources, such as information about traffic, weather conditions, accidents, road closures, etc. (e.g., similar to the computations performed by the client ETA determine 140).

Once the individual vehicle ETAs are determined, depending on implementation, the vehicle ETA determine 112 can identify the vehicle ETA 151 as the individual vehicle ETA with the shortest or smallest ETA as compared to the other individual vehicle ETAs of the set of drivers. In another example, the vehicle determine 112 can identify the vehicle ETA 151 as the average ETA of the individual vehicle ETAs of the set of drivers. Still further, in some examples, a user of the system 100 can configure the dispatch 110 to adjust the dispatch radius for identifying the set of vehicles and/or indicate how to determine the vehicle ETA 151. Once the vehicle ETA 151 is determined, the vehicle ETA determine 112 can provide the vehicle ETA 151 to the request proxy 150.

The ETA match of the request proxy 150 can receive or retrieve the user ETA 143 and the vehicle ETA 151, and periodically check or compare the ETAs 143, 151 in order to determine if/when the ETAs 143, 151 substantially match or are within a predetermined amount of time of each other (depending on user configuration). When the ETA match determines that the ETAs 143, 151 substantially match or are within a predetermined amount of time of each other (at the time of comparison), the request proxy 150 can trigger or make a transport request 155 on behalf of the user. In addition, depending on implementation, the request proxy 150 can trigger or make a transport request 155 when the user ETA 143 is larger than the vehicle ETA 151 by a predetermined amount of time of each other (e.g., 1 minute), so that after the dispatch 110 processes the transport request 155, the selected driver can potentially get to the specified location before the user. In another example, the request proxy 150 can trigger or make a transport request 155 when the vehicle ETA 151 is larger than the user ETA 143 by a predetermined amount of time of each other.

As an example, if the user ETA 143 and the vehicle ETA 151 are both 5 minutes, the request proxy 150 can determine that the user and a driver may arrive at the specified location data point at substantially the same time. As such, the request proxy 150 can trigger or transmit the transport request 155 to the dispatch 110 in order to cause the dispatch 110 to begin processing the transport request 155 (similarly as though the user had made the transport request from the client application 181 at this time). The transport request 155 can include a user identifier (ID) or client device ID, and the pickup location as the specified location data point.

According to some examples, the request proxy 150 can determine how, when, and/or how often the system 100 should determine the user ETA 143, determine the vehicle ETA 151, and/or compare the ETAs 143, 151. An administrative user of the system 100 can control the operation of the request proxy 150 by providing user input to change configuration of the request proxy 150. In a first example, the request proxy 150 can periodically determine the ETAs 143, 151 at substantially the same rate or frequency by (i) causing the client ETA determine 140 to determine the user ETA 143 and subsequently receiving the user ETA 143, and (ii) causing the vehicle ETA determine 112 to determine the vehicle ETA 151 and subsequently receiving the vehicle ETA 151. Once the request proxy 150 receives the ETAs 143, 151, the request proxy 150 can then periodically compare the ETAs 143, 151 (e.g., at substantially the same rate as determining the ETAs 143, 151).

In another example, the request proxy 150 can periodically determine the ETAs 143, 151 asynchronously. For example, the request proxy 150 can continue to receive the ETAs 143, 151 every time the client ETA determine 140 periodically determines the user ETA 143 and every time the vehicle ETA determine 112 determines the vehicle ETA 151. As an example, the vehicle ETA determine 112 can periodically determine the vehicle ETA 151 at a first rate (e.g., every three seconds, every five seconds, etc.), while the client ETA determine 140 can periodically determine the user ETA 143 at a different second rate (e.g., every two minutes, every three minutes, etc.). When it is time for the ETA match to compare the ETAs 143, 151, the ETA match can compare the latest ETAs 143, 151 it has received from the client ETA determine 140 and the vehicle ETA determine 112.

Still further in some examples, the request proxy 150 can dynamically change how often to determine the ETAs 143, 151 and/or compare the ETAs 143, 151 (referred to herein as checking the ETAs). The frequency of checking the ETAs can be based on (i) the length of time of the last determined user ETA 143 or vehicle ETA 151, and/or (ii) the difference between the last determined ETAs 143, 151. For example, as the difference between the ETAs 143, 151 approaches zero (e.g., the ETAs are becoming more equal), the request proxy 150 can check the ETAs more frequently. In another example, if the difference becomes greater, the request proxy 150 can check the ETAs less frequently.

As an example, at time t=t1, the request proxy 150 can determine that the user ETA 143 is one hour and that the vehicle ETA 151 is 3 minutes (difference at time t=t1 is 57 minutes). Time t=t1 can correspond to a time just after the request proxy 150 receives the pre-request 183. The first or default rate of checking the ETAs 143, 151 can be every 3 minutes. However, because the difference between the ETAs 143, 151 is greater than or equal to a first threshold (e.g., 20 minutes), the request proxy 150 can check the ETAs 143, 151 every 10 minutes instead (a second rate). The next time to check the ETAs 143, 151 can be at time t=t2 (or t1+10 min). At time t=t2, the user ETA 143 is 51 minutes and the vehicle ETA 151 is 4 minutes. The request proxy 150 can continue to check at the rate of every 10 minutes until the difference is less than the first threshold.

Once the difference is less than the first threshold, the request proxy 150 can check the ETAs 143, 151 every 3 minutes (back to the first rate). If the difference between the ETAs 143, 151 becomes less than a second threshold (e.g., 10 minutes), the request proxy 150 can check the ETAs 143, 151 at a more frequent third rate (e.g., every minute). When the difference is substantially 0 or within a predetermined amount of time (e.g., 10 seconds, 30 seconds, etc.), the request proxy 150 can transmit the transport request 155 to the dispatch 110. In this manner, by changing the frequency of checking the ETAs 143, 151, the system 100 can reduce performing extra computations until necessary.

Referring back to FIG. 1A, when the dispatch 110 receives the transport request 155, the request manage 114 can process the transport request 155 similarly as though it has received an on-demand transport request from the client application 181. The driver select 116 can identify, from a set of drivers, a driver to perform the transport service for the user. In one example, the vehicle ETA determine 112 can provide, to the driver select 116, information about the last set of drivers that the vehicle ETA determine 112 had identified in determining the vehicle ETA 151. The driver select 116 can then select a driver from that set of drivers. The dispatch 110 can transmit an invitation 193 to the corresponding driver device 190 of the selected driver. In addition, the dispatch 110 can transmit status information 117 to the client device 180 of the user that made the pre-request 183, indicating that a driver has been selected for the user (e.g., subsequently after the invitation 193 is accepted by the driver). Information about the driver can also be provided with the status information 117. In this manner, a transport service can be arranged for a user and on behalf of the user based on the user's ETA to a specified location.

FIG. 1B illustrates another example system to arrange a transport service for a user. FIG. 1B is similar to FIG. 1A, but corresponds to an example in which a system operated by a different entity or service (e.g., a third party system 100a as compared to the transport arrangement system 100b) periodically checks the ETAs 143, 151. For example, a client device 180 can include a third party application 182 that is created by a third party developer and designated to communicate with the third party system 100a. However, the third party application 182 can also use one or more APIs that are provided by the system 100b in order to communicate with the system 100b through the client device interface 120b. According to an example, through the use of the one or more APIs, a user operating the third party application 182 can view content or information provided by the system 100b along with content or information provided by the system 100a.

The third party application 182 can provide a user interface(s) to enable the user to make a pre-request 183, such as described with FIG. 1A. When the user makes the pre-request 183, the client device interface 120a can receive information from the pre-request 183 including the specified location data point that the user is traveling to (or a specified location corresponding to a transit stop or station) and the user's method of transit. The client ETA determine 140 can periodically receive position information 141 from the client device 180 and can periodically determine the user ETA 143 based on the user's position information 141, the specified location data point, transit information 161, and/or map information 171, as described with FIG. 1A.

In addition, when the user makes the pre-request 183, the system 100b can receive the pre-request 183 or some information from the pre-request 183, such as the user or device ID, the specified location data point, and/or the specified vehicle type. The vehicle ETA determine 112 can periodically determine the vehicle ETA 151 based on the specified location data point, the current positions of the set of available drivers that are within a predetermined distance of the specified location data point, map information 171, real-time traffic information, weather information, and/or road closure information, as described with FIG. 1A.

The request proxy 150 can periodically receive the user ETA 143 from the client ETA determine 140 and can communicate with the third party application 182 to periodically receive the vehicle ETA 151. Because the third party application 182 can be in communication with both the third party system 100a and the system 100b, the request proxy 150 can periodically check the ETAs 143, 151, as described in FIG. 1A. When the ETA match determines that the ETAs 143, 151 are substantially equal or are within a predetermined amount of time of each other (e.g., within 30 seconds), the request proxy 150 can transmit a request trigger 153 to the third party application 182. The third party application 182 can then automatically transmit the transport request 155 to the dispatch 110 on behalf of the user. Such a transport request 155 can be similar to a transport request that is transmitted from the client device 180 to the dispatch 110 using the client application 181, such as described in FIG. 1A. In fact, the client device 180 can store both applications 181, 182 concurrently, so that if the user wanted a transport service in real-time, the user can use the client application 181 as opposed to the third party application 182.

As another alternative, one or more components of the third party system 100a and/or the system 100b can be provided as part of the third party application 182. For example, the request proxy 150 can be implemented as part of the third party application 182 so that the user can input a pre-request 183 using the third party application 182 and the request proxy 150 can schedule a time when to make the transport request 155 for the user. The request proxy 150 can dynamically update this time based on the user ETA 143 and the vehicle ETA 151 that it receives over one or more networks from the third party system 100a and system 100b, respectively. In another example, the client ETA determine 140 can be a part of the third party application 182 so that the third party application 182 periodically determines the user ETA 143 and communicates with the system 100 via the one or more APIs to periodically receive the vehicle ETA 151. Still further, in another example, the third party application 182 can communicate with other sources over one or more networks to receive transit information 161 and/or map information 171.

Methodology

Figure 2A:
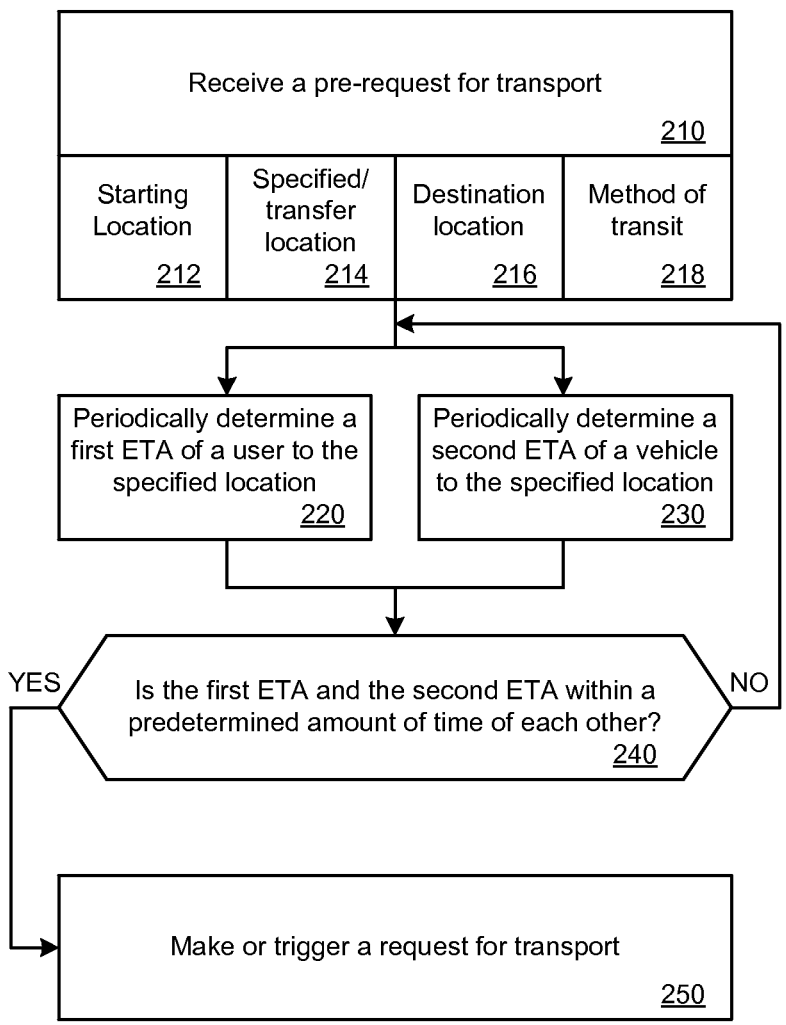
FIGS. 2A and 2B illustrate example methods for arranging a transport service for a user, according to an embodiment.
Figure 2B:
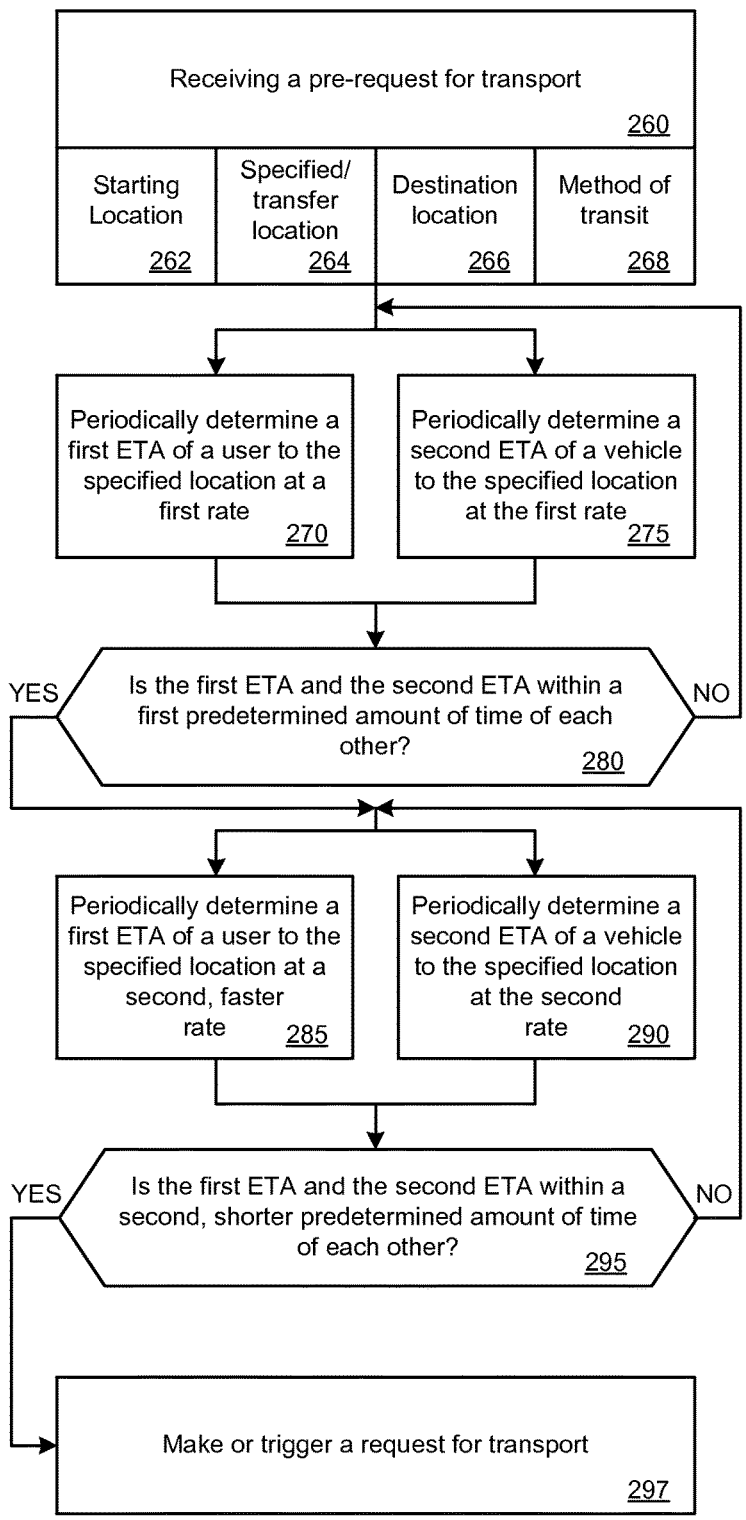

FIGS. 2A and 2B illustrate example methods for arranging a transport service for a user, according to an embodiment. Methods such as described by examples of FIGS. 2A and 2B can be implemented using, for example, components described in FIG. 1A or 1B. Accordingly, references made to elements of FIG. 1A or 1B are for purposes of illustrating a suitable element or component for performing a step or sub-step being described.

In FIG. 2A, a transport service arrangement system, such as the system 100 of FIG. 1A, can receive a pre-request for transport (210). Depending on implementation, the pre-request can include a starting location (e.g., a current location of the user when the pre-request was made, a starting transit station or stop) (212), a specified or transfer location (e.g., where the user will end the travel using a method of transit, such as a transit station or stop) (214), a destination location (e.g., where the user wants to continue to travel to after using the method of transit) (216), a method of transit (218), and/or other information, such as a vehicle type. One of more of the locations can be provided as an address, a point of interest, or a location data point.

According to an example, the user can operate an application (e.g., the client application 181 of FIG. 1A or a third-party application 182 of FIG. 1B) to specify a method of transit that the user is planning on taking as part of the user's trip. The application can display selectable features that the user can select to specify the method of transit, such as different companies or brands of different methods of transits (e.g., a commuter train line called TrainSystemA, a different commuter train line called TrainSystemB). The user can specify the method of transit (e.g., TrainSystemA), the start location (e.g., Sunnyvale train station), and an end location (e.g., San Francisco train station). In one example, the system 100 can receive the pre-request with the specified information and access transit information corresponding to the specified method of transit (e.g., the train schedule and station information for TrainSystemA). The system 100 can then identify the address and/or location data point of the Sunnyvale train station as the start location and/or the address and/or location data point of the San Francisco train station as the transfer location. Such information can also be used for purposes of determining the user ETA. In another example, the application can communicate with other applications stored on the client device or other network services in order to access transit information corresponding to the specified method of transit and determine the starting location data point and/or the transfer location data point.

The system 100 can determine the user ETA from the user's current location to the specified location data point (the first ETA, as shown in FIG. 2A) (220) and concurrently, can determine the vehicle ETA for a vehicle (or a set of vehicles) based on the position of the individual vehicles to the specified location data point (the second ETA, as shown in FIG. 2A) (230). For example, the user ETA can be determined based, at least in part, on the current position of the user (e.g., the last received/determined location data point of the user) and the specified location data point, and/or other information, such as transit information corresponding to the method of transit. Depending on implementation, the system 100 can determine the user ETA and the vehicle ETA at substantially the same time or at different instances of time (e.g., different periods). The system 100 can continuously determine the ETAs until the ETAs are determined to be substantially equal.

Figure 3:
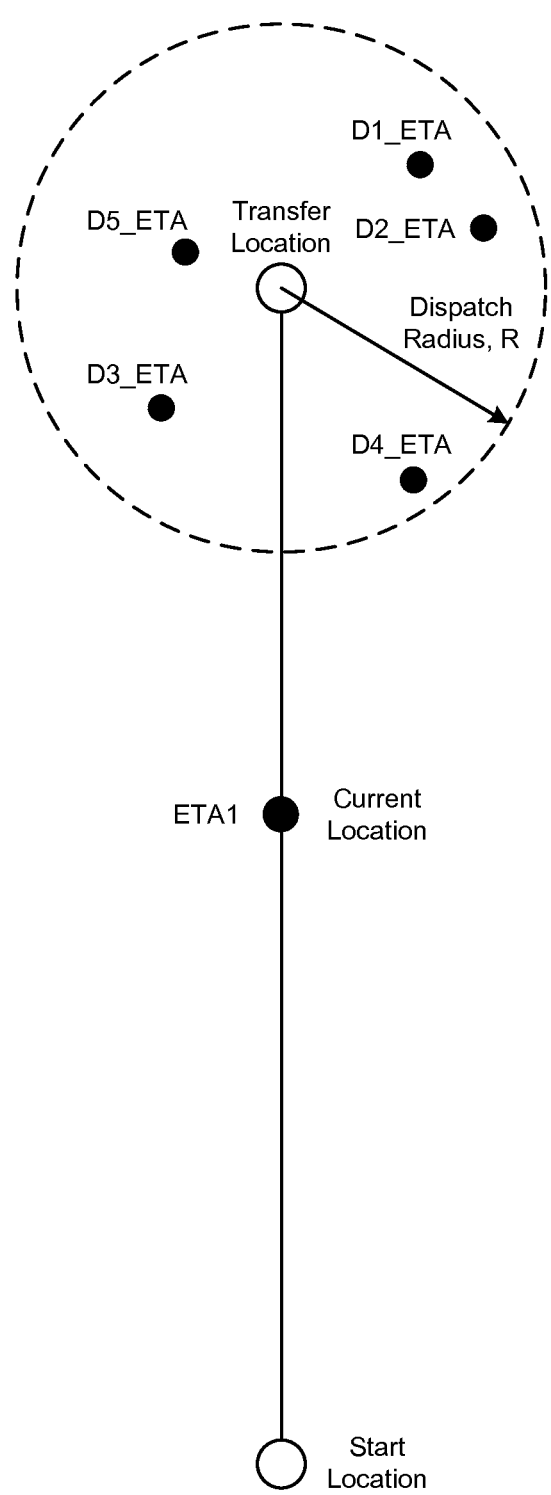
FIG. 3 is a diagram illustrating portions of the methods of FIGS. 2A and 2B, in some examples.

For example, for illustrative purposes, FIG. 3 shows a diagram depicting the user's first path of travel from a start location to a transfer location (e.g., a specified location in which the user wants a transport service once the user gets off the method of transit). The user's second path of travel (not shown in FIG. 3) corresponding to the second (relayed) trip would be from the transfer location to the user's destination location. For purpose of simplicity, the user's first path of travel is shown as a straight line, whereas in reality, the user may travel along a route with different turns, curves, portions of straight lines, etc., based on the user's method of travel. The start location can correspond to the location inputted by the user in conjunction with a method of transit, such as a starting station, stop, dock, etc. that the user begins the first trip on. In another example, the start location can correspond to the location of the user when the user made the pre-request for transport. The transfer location can correspond to an end location of the first trip inputted by the user in conjunction with the method of transit, such as the end station, stop, dock, etc., that the user ends the first trip on, or an inputted or selected pickup location specified by the user for a transport service.

The system 100 can periodically determine the user ETA by determining the user's position information. For example, at one instance in time (illustrated by FIG. 3), the system 100 can determine the user ETA, shown as ETA1 (14 minutes), based on the current location of the user (or the last received/determined location data point of the user), one or more previous location data points of the user, the specified method of transit, transit information, mapping information, traffic information, and/or the transfer location data point. The system 100 can also determine the vehicle ETA by (i) identifying, at this instance in time, a set of drivers/vehicles having a position within the dispatch radius, R, of the transfer location data point (or within a specified region that includes the transfer location data point), and (ii) determining the individual ETAs of the set of drivers to the transfer location data point.

For example, the system 100 identified 5 drivers within the dispatch radius, R. The system 100 can determine the ETAs for each of the 5 drivers, D1_ETA (4 minutes), D2_ETA (5 minutes), D3_ETA (4 minutes), D4_ETA (6.5 minutes), and D5_ETA (2.5 minutes). Depending on implementation, the system 100 can determine the vehicle ETA by selecting the shortest ETA (e.g., D5_ETA), selecting the longest ETA (e.g., D4_ETA), averaging all the ETAs (e.g., 4.4 minutes), or averaging a set of the ETAs (e.g., average the three shortest ETAs, so 3.5 minutes), or using other variations.

Referring back to FIG. 2A, after determining the user ETA and the vehicle ETA, the system 100 can determine if the user ETA and the vehicle ETA are substantially equal or is within a predetermined amount of time of each other (e.g., 30 seconds) (240). In some examples, the system 100 can compare the ETAs every time it determines the user ETA and the vehicle ETA (e.g., periodically check the ETAs at substantially the same frequency as periodically determining the user ETA and the vehicle ETA). If the ETAs do not substantially match or are not within a predetermined amount of time of each other, the system 100 can continue to determine the ETAs at the next instance of time. In this manner, the system 100 can continue to periodically check the ETAs until it determines when the user ETA and the vehicle ETA are substantially equal or within a predetermined amount of time of each other. In some examples, the system 100 can change how often it checks the ETAs based on the difference of the ETAs. Referring back to FIG. 3, the ETA1 (14 minutes) does not substantially match the vehicle ETA (such as the shortest ETA, 2.5 minutes for D5_ETA). The system 100 can continue to periodically determine the ETAs (as the movements of the user and the drivers change) until the user ETA and the vehicle substantially match.

When the system 100 determines that the ETAs are substantially equal or within a predetermined amount of time of each other, the system 100 can make or trigger a request for transport on behalf of the user (250). The request can include a pickup location, which corresponds to the transfer location data point, as well as other information, such as the user ID. By making or triggering the request for transport, the system 100 can perform the transport service arrangement process by selecting a driver to provide the transport service for the user. The system 100 can then notify the user of the transport service and provide the user with information about the vehicle ETA and/or the location for pickup (e.g., the specified location data point). In this manner, the system 100 can automatically process a request for the user even before the user arrives at the transfer location, as opposed to the user having to make a transport request once she arrives at the San Francisco train station and then having to wait a certain amount of time for a selected driver to arrive.

As an addition or an alternative, the system 100 can also transmit one or more status messages to the application on the client device in order to cause the application to provide updates to the user as to when the transport request will be made for the user. For example, based on the comparison of the ETAs, if the system 100 determines that the difference between the ETAs (the user ETA is 7 minutes and the driver ETA is 3 minutes) has reached a certain pre-configured amount of time (e.g., the difference of 4 minutes), the system 100 can inform the user that the transport request will be made for the user in approximately 4 minutes. In addition, the system 100 can also inform the user that the user is approximately 7 minutes away from the specified location. Still further, if the user has provided the destination location (216), the system 100 can also calculate the estimate time of arrival from the specified location to the destination location (e.g., 15 minutes). The system 100 can inform the user that the user is approximately 22 minutes (7 minutes plus 15 minutes) away from the destination location. Additionally, in some examples, by enabling the user to make a pre-request, the user can tentatively schedule a transport service but have the ability to cancel or prevent the actual request for transport from being made before being notified that the transport service has been made and/or arranged for the user.

FIG. 2B is another example method for arranging a transport service for a user. The method in FIG. 2B is similar to the method of FIG. 2A, but illustrates the system 100 dynamically changing the frequency of determining and comparing ETAs. According to an example, the system 100 receives a pre-request for transport (260), which can include information about a starting location (262), a specified or transfer location (264), a destination location (266), and/or a method of transit (268). The system 100 can periodically determine (i) the user ETA to the specified location data point based on the user's position information (270), and (ii) the vehicle ETA to the specified location data point (275). In this example, the system 100 can periodically determine the user ETA and the vehicle ETA and concurrently at a first rate (e.g., every 8 minutes).

According to an example, at every instance when the ETAs are determined, the system 100 can also compare the ETAs to determine if the ETAs are within a first predetermined amount of time of each other (e.g., 5 minutes) (280). If the ETAs are different by more than the first predetermined amount of time (e.g., the user ETA is 20 minutes but the vehicle ETA is 2 minutes), the system 100 can continue to periodically determine the ETAs and/or compare the ETAs at the first rate. If the ETAs is equal to or within the first predetermined amount of time of each other (e.g., the user ETA is 7 minutes but the vehicle ETA is 3 minutes), the system 100 can determine the ETAs (285, 290), and/or compare the ETAs at a second, faster rate (e.g., every 1 minute).

The system 100 can determine whether the ETAs are substantially equal or within a shorter, second predetermined amount of time of each other (e.g., 30 seconds) (295). If not, the system 100 can continue to periodically determine the ETAs and/or compare the ETAs at the second rate. If yes, the system 100 can make or trigger a request for transport on behalf of the user, such as described with FIGS. 1A through 2A (297).

Figure 4A:
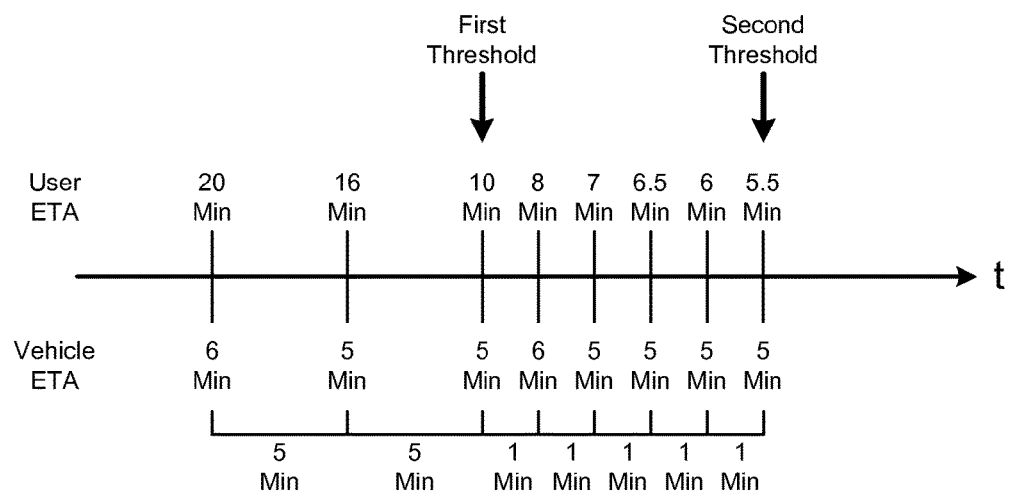
FIGS. 4A and 4B are diagrams illustrating use case examples of periodically determining estimated times of arrivals, according to an embodiment.
Figure 4B:
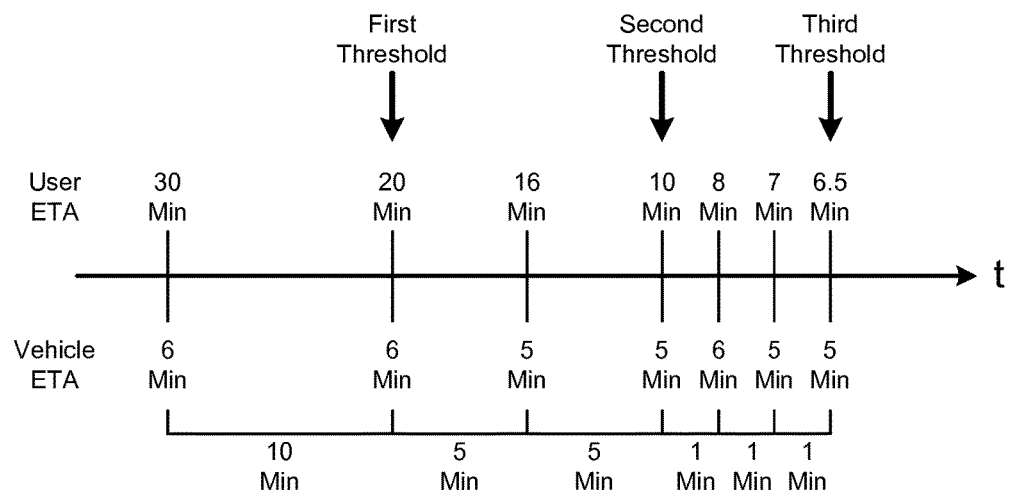

FIGS. 4A and 4B are diagrams illustrating use case examples of periodically determining the ETAs. In FIG. 4A, the system 100 is first comparing the user ETA with the vehicle ETA at a first rate (e.g., every 5 minutes). At a first time, t=t1, the user ETA is 20 minutes and the vehicle ETA is 6 minutes. The next instance in time, t=t2, the user ETA is 16 minutes and the vehicle ETA is 5 minutes. At an instance when the system 100 determines that the ETAs are within a first threshold amount (e.g., 5 minutes) of each other, the system 100 can periodically compare the ETAs at a second rate (e.g., every 1 minute). For example, in FIG. 4A, at time t=t3, the system 100 has determined that the user ETA and the vehicle ETA are within the first threshold amount.

The next time, t=t4, that the system 100 determines and/or compares the ETAs can be 1 minute later. The system 100 can then periodically determine and/or compare the ETAs at the second rate until it determines that the ETAs are within a second threshold amount (e.g., 30 seconds) of each other. When the system 100 determines that the ETAs are within the second threshold amount, the system 100 can trigger or make a request for transport on behalf of the user. Note that the vehicle ETA can change over time as vehicles move and change positions and drivers can change statuses, such as from being available to being unavailable or from being unavailable to available.

FIG. 4B illustrates another example in which the system 100 periodically compare the ETAs at three different rates. The system 100 may have been periodically comparing ETAs at a first rate, such as every 10 minutes (e.g., starting from when the user ETA was 1.5 hours after the pre-request was made). When the system 100 determines that the ETAs are within a first threshold amount (e.g., 10 minutes), the system 100 can start to periodically determine and/or compare ETAs at a second rate (e.g., every 5 minutes). When the system 100 determines that the ETAs are within a second threshold amount (e.g., 5 minutes), the system 100 can start to periodically determine and/or compare ETAs at a third rate (e.g., every 1 minute). When the system 100 determines that the ETAs are within a third threshold amount (e.g., 1.5 minutes in the example of FIG. 4B), the system 100 can trigger or make a request for transport on behalf of the user. In this manner, the system 100 can dynamically check for ETA updates more frequently as the difference between the ETAs approach zero.

Hardware Diagrams

Figure 5:
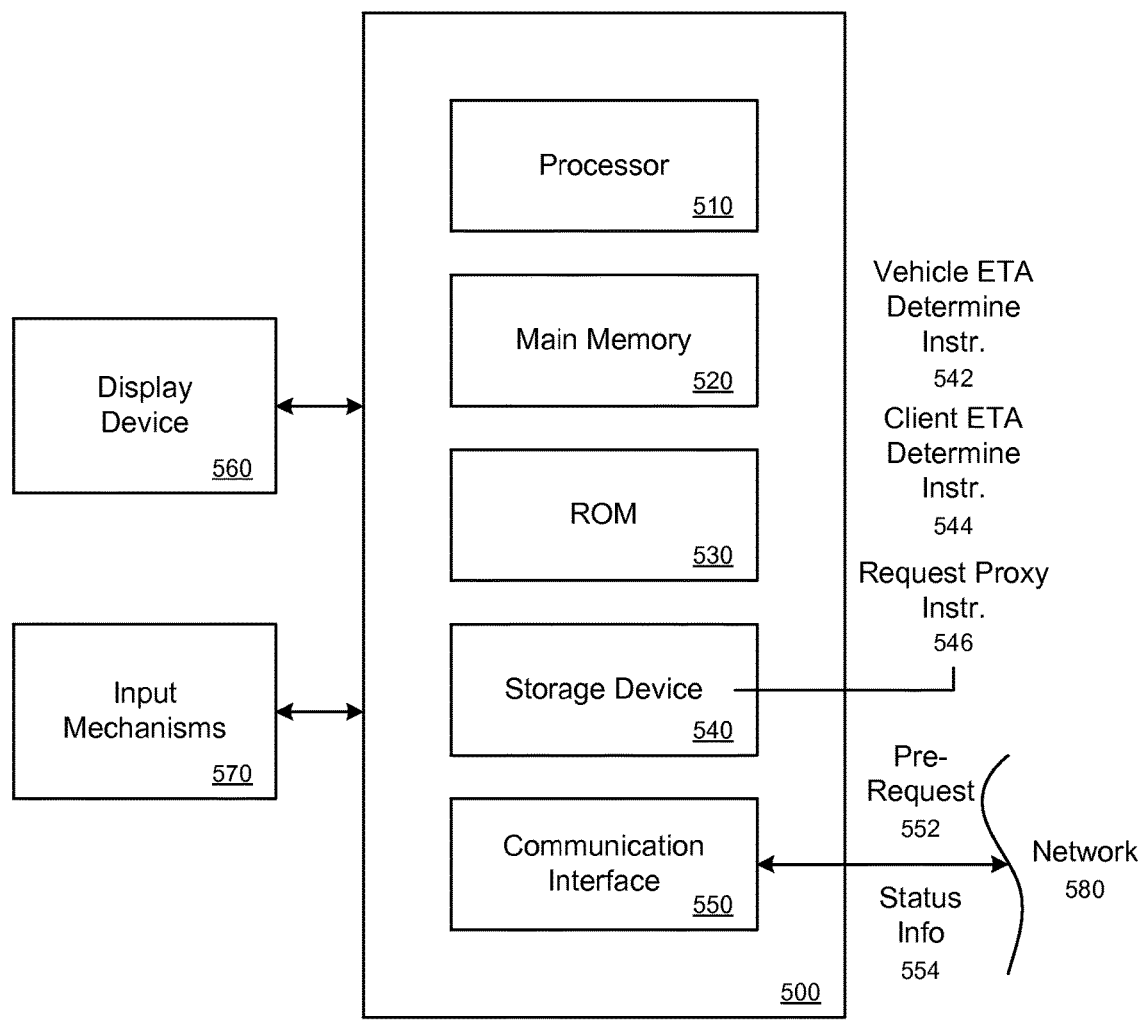
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1A or 1B, the system 100 may be implemented using a computer system such as described by FIG. 5. The system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including vehicle ETA determine instructions 542, client ETA determine instructions, and request proxy instructions 546.

For example, the processor 510 can execute the vehicle ETA determine instructions 542 to implement logic for periodically determining the vehicle ETA for one or more of a set of vehicles, such as described in FIGS. 1A through 4B, and execute the client ETA determine instructions 544 to implement logic for periodically determining the user ETA, such as described in FIGS. 1A through 4B. The processor 510 can also execute the request proxy instructions 546 to implement logic for receiving pre-requests 552 from applications, periodically comparing ETAS, and triggering or making requests for transport on behalf of users, such as described in FIGS. 1A through 4B.

The communication interface 550 can enable the computer system 500 to communicate with one or more networks 580 (e.g., cellular network) through use of the network link (wireless or wireline). Using the network link, the computer system 500 can communicate with one or more other computing devices and/or one or more other servers or datacenters. In some variations, the computer system 500 can receive a pre-request 552 from an application running on a client device of a user via the network link. The pre-request 552 can include the user ID or device ID, a start location, a specified/transfer location, a destination location, information about a method of transit, and/or a vehicle type selection.

The processor 510, through execution of instructions, can determine when the user ETA and the vehicle ETA is substantially equal or within a predetermined amount of time of each other. When this determination is made, the processor 510, through execution of instructions, can make or trigger a request for transport on behalf of the user and transmit a status information 554 to the client device to inform the user that the request has been made, such as described in FIGS. 1A through 4B.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
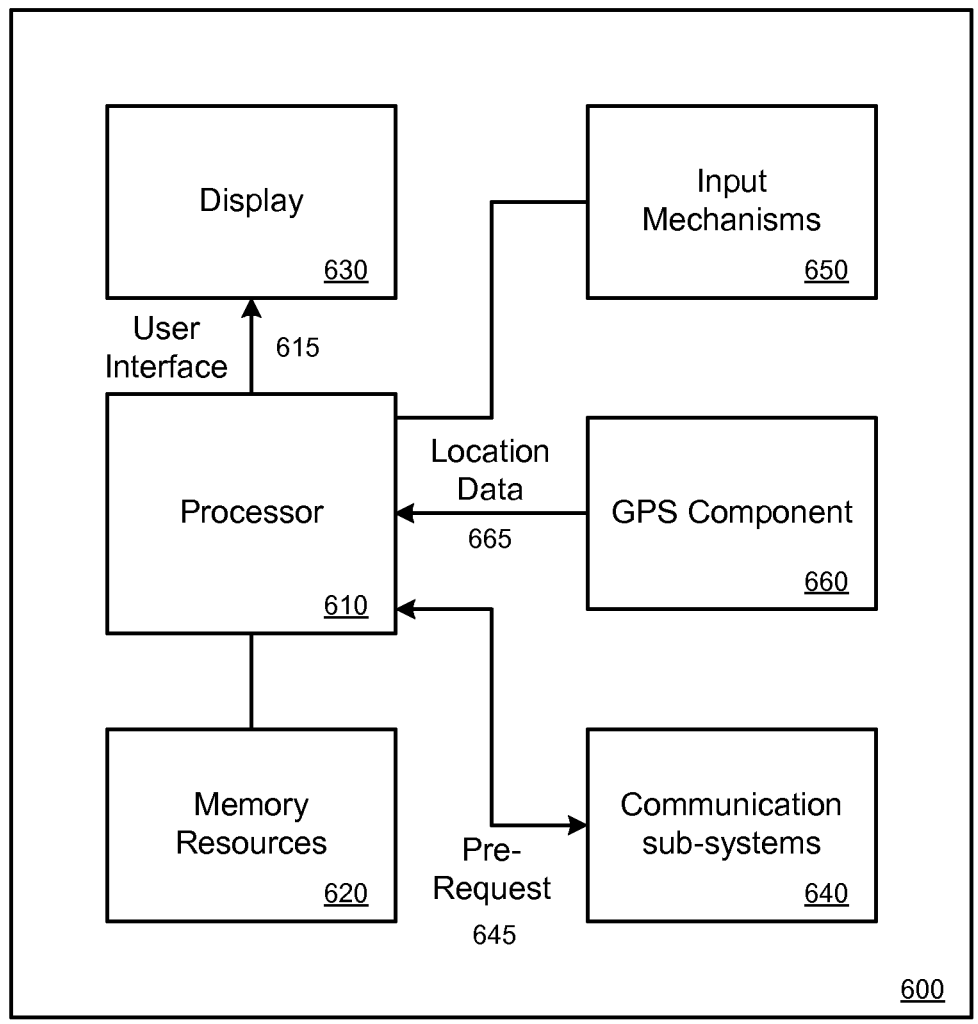
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a client device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), one or more location detection mechanisms (e.g., GPS component) 660, and a camera (not shown in FIG. 6). In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions described with implementations, such as described by FIGS. 1A through 5, and elsewhere in the application. In particular, the processor 610 can execute instructions and data stored in the memory resources 620 in order to operate a client service application or a third-party application, as described in FIGS. 1A through 5. Still further, the processor 610 can cause one or more user interfaces 615 to be displayed on the display 630, such as one or more user interfaces provided by the service application. Such a user interface 615 can display selectable features, for example, to enable the user to specify a method of transit, a start station or stop (or a start location data point), an end station or stop (or a specified location data point), and/or a final destination the user wants to travel to.

A user can operate the computing device 600 to operate the client application in order to make a pre-request 645 for a transport service. The pre-request 645 can include the method of transit, the start location data point, the specified location data point, and/or a vehicle type selection. In one example, after the pre-request 645 is made, the client application can periodically receive or determine location data point 665 from the GPS component 660 and periodically provide the location data point 665 to the transport arrangement system (not shown in FIG. 6). The transport arrangement system can use the location data point 665 to determine the user ETA to the specified location data point, as described in FIGS. 1A through 5. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a What is being claimed is:

1. A method of arranging a transport service in a computerized network transport service system, the method being performed by one or more processors and comprising:
   determining a pre-request for a user to receive a transport service, the pre-request specifying a start location and a destination for the transport service;
   remotely monitoring (i) a user device to determine position information as a user travels towards the start location, and (ii) a set of computing devices associated with a set of vehicles to determine vehicle position information for the set of vehicles;
   determining (i) a first estimated time of arrival (ETA) for the user to arrive at the start location based, at least in part, on the position information of the user device, and (ii) a second ETA for at least a first vehicle in the set of vehicles to arrive at the start location based, at least in part, on the vehicle position information, wherein determining the first ETA includes determining a rate of travel based on the position information of the user device and a previous position of the user device at a previous instance in time;
   determining when the first ETA and the second ETA are within a predetermined threshold amount of time of each other; and
   in response to determining that the first ETA and the second ETA are within the predetermined threshold amount of time of each other, automatically initiating, without user input, the transport service for the user, by selecting a vehicle from the set of vehicles to provide the transport service, and by communicating the start location to a driver of the selected vehicle;
   wherein the transport service is automatically initiated as part of a process that anticipates the transport service for the user, and reduces overall wait times of multiple users with respect to receiving the transport services.

2. The method of claim 1, further comprising:
   receiving, from the user device, data corresponding to at least one of (i) the start location, (ii) the destination, or (iii) a method of transit.

3. The method of claim 2, wherein periodically determining the first ETA includes using at least one of (i) map information of a geographic region that includes the start location and the destination, or (ii) a schedule corresponding to the method of transit.

4. The method of claim 1, wherein the set of vehicles includes two or more vehicles, and wherein determining the second ETA includes determining an individual ETA for each of the vehicles in the set of vehicles, and identifying which of the individual ETAs is the smallest ETA.

5. The method of claim 1, wherein the set of vehicles includes two or more vehicles, and wherein determining the second ETA includes determining an individual ETA for each of the vehicles in the set of vehicles, and determining an average ETA of the individual ETAs.

6. A non-transitory computer-readable medium storing instructions that, when executed by one or more processors of a computing device, causes the computing device to:
   determine a pre-request for a user to receive a transport service, the pre-request specifying a start location and a destination for the transport service;
   determine at a first periodic rate, (i) a first estimated time of arrival (ETA) for a user to arrive at the start location based, at least in part, on a position of a user device operated by the user, and (ii) a second ETA for at least a first vehicle in a set of vehicles to arrive at the start location based, at least in part, on vehicle position information for the set of vehicles, wherein determining the first ETA during travel towards the specified location includes determining a rate of travel based on the position of the user device and a previous position of the user device at a previous instance in time;
   determine when the first ETA and the second ETA are within a first predetermined threshold amount of time of each other;
   determine at a second periodic rate that is greater than the first periodic rate, (i) the first ETA, and (ii) the second ETA;
   determine when the first ETA and the second ETA are within a second predetermined threshold amount of time of each other, the second predetermined threshold amount of time being smaller than the first predetermined threshold amount of time; and
   in response to determining that the first ETA and the second ETA are within the second predetermined threshold amount of time of each other, automatically initiate, without user input, the transport service for the user, by selecting a vehicle from the set of vehicles to provide a transport service for the user based, at least in part, on the specified location, and by communicating the start location to a driver of the selected vehicle;
   wherein the transport service is automatically initiated as part of a process that anticipates the transport service for the user, and reduces overall wait times of multiple users with respect to receiving the transport services.

7. The non-transitory computer-readable medium of claim 6, wherein the instructions cause the computing device to further:
   receive, from the user device, data corresponding to at least one of (i) the start location, (ii) the destination, or (iii) a method of transit.

8. The non-transitory computer-readable medium of claim 7, wherein the instructions cause the computing device to periodically determine the first ETA by using at least one of (i) map information of a geographic region that includes the start location and the destination, or (ii) a schedule corresponding to the method of transit.

9. The non-transitory computer-readable medium of claim 6, wherein the set of vehicles includes two or more vehicles, and wherein the instructions cause the computing device to determine the second ETA by determining an individual ETA for each of the vehicles in the set of vehicles, and identifying which of the individual ETAs is the smallest ETA.

10. The non-transitory computer-readable medium of claim 6, wherein the set of vehicles includes two or more vehicles, and wherein the instructions cause the computing device to determine the second ETA by determining an individual ETA for each of the vehicles in the set of vehicles, and determining an average ETA of the individual ETAs.

11. A method of arranging a transport service in a computerized network transport service system, the method being performed by one or more processors and comprising:

determining a pre-request for a user to receive a transport service, the pre-request specifying a start location and a destination for the transport service;

remotely monitoring (i) a user device to determine position information as a user travels towards the start location, and (ii) a set of computing devices associated with a set of vehicles to determine vehicle position information for the set of vehicles;

determining (i) a first estimated time of arrival (ETA) for a user to start location based, at least in part, on a position of a user device operated by the user, (ii) and a second ETA for at least a first vehicle in a set of vehicles to the specified location based, at least in part, on vehicle position information for the set of vehicles, wherein determining the first ETA during travel towards the start location includes determining a rate of travel based on the position of the user device and a previous position of the user device at a previous instance in time;

determining, using the processor, when the first ETA and the second ETA are within a predetermined threshold amount of time of each other; and in response to determining that the first ETA and the second ETA are within the predetermined threshold amount of time of each other, automatically initiating, without user input, the transport service for the user, by selecting a vehicle from the set of vehicles to provide the transport service, and by communicating the start location to a driver of the selected vehicle;

wherein the transport service is automatically initiated as part of a process that anticipates the transport service for the user, and reduces overall wait times of multiple users with respect to receiving the transport services.

12. The method of claim 11, further comprising:

receiving, from the user device, data corresponding to at least one of (i) the start location, (ii) the destination, or (iii) a method of transit.

13. The method of claim 12, wherein the rate of travel is based on the method of transit.

14. The method of claim 12, wherein periodically determining the first ETA includes using at least one of (i) map information of a geographic region that includes the starting location and the specified location, or (ii) a schedule corresponding to the method of transit.

15. The method of claim 11, wherein determining the second ETA includes receiving information about the second ETA from a set of computing devices associated with the set of vehicles.

* * * * *